UNITED STATES PATENT OFFICE.

WILLIAM MORRISON, OF DES MOINES, IOWA.

ALKALINE BATTERY.

975,980.
Specification of Letters Patent. Patented Nov. 15, 1910.
No Drawing. Application filed December 3, 1909. Serial No. 531,230.

*To all whom it may concern:*

Be it known that I, WILLIAM MORRISON, a citizen of the United States of America, and resident of Des Moines, Iowa, have invented a certain new and useful Improvement in Alkaline Batteries, of which the following is a specification.

My invention relates to improvements in alkaline batteries, and has for its object the production of a depolarizing material which, when applied to a suitable support or grid in the proper manner, produces an efficient plate.

A further object is the production of a positive-pole plate or cathode in which mercury is combined with silver in such a manner as to produce a negative element of great efficiency and cheapness.

In the preparation of the element, I take for example silver and mercury in the proportion of one pound of silver to five pounds or more of mercury and dissolve them in nitric acid. I then add caustic potash in excess of that necessary to precipitate both, and thus precipitate the oxids of silver and mercury. I then wash the precipitate in hot water, preferably containing a little caustic soda or potash, and dry the precipitate. The precipitate is then packed into a suitable support or grid, for example one of copper, great pressure being used in forcing the material in place. The negative electrode is then ready for use in an alkaline battery, without forming.

When used in a battery with a suitable alkaline electrolyte and a suitable negative-pole plate, the depolarizing material is reduced upon discharge to a silver amalgam, which, upon the re-charge, again oxidizes, resuming its original state. By dissolving the metals and precipitating their oxids, the silver and mercury are completely mixed in the proper proportion, and in much better shape than when the oxids of the metals are mechanically mixed. By the use of the excess of caustic potash the metals are oxidized to a very high state of oxidation, and approximately that which they will receive in the re-charge of the battery, and consequently the depolarizer should be packed into the plate as solidly as possible, as on the discharge the oxygen taken from the plate leaves the material quite porous.

By the use of a plate formed as noted above, I attain nearly, if not quite, as good results as those attained by the use of pure silver, and at a very much reduced cost. Plates may also be made by other methods; for instance: After applying the oxids of silver and mercury to the support, and prior to using the electrode in a battery, I may subject it to electrolytic reduction in a solution of potassium hydrate. The oxids will be completely reduced, leaving a very porous, absorbent amalgam of silver and mercury, and in this shape it will be seen it could readily be applied to a battery, but this is not as advantageous as applying the oxids direct. Attention is called to this to show a method of applying the material in such a condition as to possess the proper porosity. While I describe the use of the oxids as my preferred method in making this electrode by preliminary reduction, good results might be obtained by the use of other compounds or salts of silver and mercury. It is clear that a mixture of mercury sub-chlorid and silver chlorid in the proper proportion could be used in a like manner; of course, washing out the soluble chlorids after reducing. I prefer, however, to use the oxids, as they are already depolarizers, obviating the expense of reduction and reoxidation.

It will be noted that the materials are combined in such proportions and in such a manner as to provide the greatest amount of mercury which it is possible to hold in a solid condition by the silver when the element is discharged.

It is, of course, understood that I do not limit myself to the exact proportions noted above, as a workable battery may be made in which plates are used in which different proportions of mercury and silver are employed. It is obvious that a high proportion of mercury decreases the cost. In charging the battery, the supply of current is preferably discontinued when the mercury has been reoxidized, leaving the silver in the metallic condition, to act as a support and conductor.

I claim:

1. A positive-pole electrode for reversible alkaline batteries, comprising a conductor or support, and a mechanically-applied intimate mixture of finely-divided oxids of silver and mercury on said support.

2. A positive-pole electrode for reversible alkaline batteries, comprising a conductor or support, and a mechanically-applied intimate mixture of finely-divided oxids of silver and mercury on said support, the proportion of the mercury oxid in the mixture being relatively large.

3. A positive-pole electrode for reversible alkaline batteries, comprising a conductor or support, and a mechanically-applied intimate mixture of chemically-precipitated oxids of silver and mercury on said support, the proportion of the mercury oxid in the mixture being relatively large.

4. The process of making a positive-pole electrode for reversible alkaline batteries, which consists in producing an intimate mixture of finely-divided compounds of silver and mercury, applying said mixture to a conductor or support, and electrolytically reducing said compounds to silver and mercury.

5. The process of making a positive-pole electrode for reversible alkaline batteries, which consists in producing an intimate mixture of finely-divided oxids of silver and mercury, applying said mixture to a conductor or support, and electrolytically reducing said oxids to silver and mercury.

6. The process of making a positive-pole electrode for reversible alkaline batteries, which consists in producing a solution of salts of silver and mercury, chemically precipitating a mixture of oxids of silver and mercury from said solution, and applying said mixture to a support or conductor.

Signed by me at Chicago, Illinois, this 29th day of November, 1909.

WILLIAM MORRISON.

Witnesses:
WM. B. DURNION,
E. H. CLEGG.